(12) United States Patent
Caseras et al.

(10) Patent No.: US 10,415,996 B2
(45) Date of Patent: Sep. 17, 2019

(54) UNIVERSAL INTERFACE FOR DETECTOR

(71) Applicant: SCHNEIDER ELECTRIC INDUSTRIES SAS, Rueil Malmaison (FR)

(72) Inventors: Loic Caseras, Dirac (FR); Mireille Roger, Ruelle-sur Touvre (FR); Alain Tardivon, Gourville (FR)

(73) Assignee: SCHNEIDER ELECTRIC INDUSTRIES SAS, Rueil Malmaison (FR)

( * ) Notice: Subject to any disclaimer, the term of this patent is extended or adjusted under 35 U.S.C. 154(b) by 1166 days.

(21) Appl. No.: 14/600,636

(22) Filed: Jan. 20, 2015

(65) Prior Publication Data
US 2015/0241246 A1 Aug. 27, 2015

(30) Foreign Application Priority Data

Feb. 26, 2014 (FR) ...................... 14 51525

(51) Int. Cl.

| | |
|---|---|
| *H02P 6/00* | (2016.01) |
| *H02P 6/08* | (2016.01) |
| *H02P 6/18* | (2016.01) |
| *G06F 15/00* | (2006.01) |
| *G01D 5/00* | (2006.01) |
| *G01D 11/00* | (2006.01) |
| *G05B 19/05* | (2006.01) |

(52) U.S. Cl.
CPC ............. *G01D 5/00* (2013.01); *G01D 11/00* (2013.01); *G05B 19/054* (2013.01); *G05B 2219/21114* (2013.01); *G05B 2219/21117* (2013.01)

(58) Field of Classification Search
CPC ........ G01D 5/00; G01D 11/00; G05B 19/054; G05B 2219/21114; G05B 2219/21117

USPC .................................................. 307/112–144
See application file for complete search history.

(56) References Cited

U.S. PATENT DOCUMENTS 5,818,130 A 10/1998 Gass et al.

FOREIGN PATENT DOCUMENTS

FR 2 951 264 A1 4/2011

OTHER PUBLICATIONS

"Universal Serial Bus Specification"; Compaq, Hewlett-Packard, Intel, Lucent, Microsoft, NEC, Philips; Revision 2.0; Apr. 27, 2000; XP-001544046; 9 pgs.

(Continued)

*Primary Examiner* — Brandon S Cole
(74) *Attorney, Agent, or Firm* — Oblon, McClelland, Maier & Neustadt, L.L.P.

(57) ABSTRACT

The invention relates to a universal interface (INT) arranged to be positioned between a detector (D) and a monitoring-control unit of equipment and comprising:
  a connector (40) with at least four input connection points configured for being connected to the detector (D) and notably comprising a connection point designed to be connected to a first output of the detector for receiving a first detector output signal (S1_D) and another connection point designed to be connected to a second output of the detector for receiving a second detector output signal (S2_D),
  a processing unit (UC) arranged for converting each detector output signal (S1_D, S2_D) into binary information to be sent to the monitoring-control unit of equipment and which is representative of a switched status or of a non-switched status of each output of the detector (D).

8 Claims, 5 Drawing Sheets

(56) References Cited

OTHER PUBLICATIONS

Office Action dated Mar. 26, 2019, in Japan Patent Application No. 2015-030719 (with English-language translation), 4 pgs.
Office Action dated Aug. 2, 2018, in Europe Patent Application No. 15 151 962.6 (with English-language translation), 6 pgs.
Preliminary Search Report dated Jul. 11, 2014, in French Application No. 14 51525 filed Feb. 26, 2014 (with Written Opinion and English Translation).

UNIVERSAL INTERFACE FOR DETECTOR

TECHNICAL FIELD OF THE INVENTION

The present invention relates to a universal interface designed to be arranged between a detector and a monitoring-control unit of equipment. The universal interface of the invention is designed to be connected to a detector with two wires, three wires or four wires. The detector could have an output of the NO and/or NC, PNP and/or NPN type.

PRIOR ART

A detector of the industrial type is employed for the detection of objects and is connected to a monitoring-control unit of equipment such as for example a programmable logic controller (PLC), a controller, an input/output module, a communications gateway, an actuator, etc. Each of these units of equipment requires information of different types from the detectors which are connected to it.

In the case of a simple detection of the presence or of the absence of an object, discrete binary information suffices. However, depending on the detector employed, this binary information may be supplied in various ways. It may be supplied via the opening of the output circuit of a detector. This detector is then configured with an output of the normally closed (NC) type. It may also be supplied by the closing of the output circuit of a detector. This detector is then configured with an output of the normally open (NO) type. It may also be supplied by configuring the output of a detector with respect to the positive electrical potential of the power supply, the detector then having a configuration with an NPN output, or to the negative electrical potential of the alimentation, the detector then having a configuration with a PNP output. Furthermore, the output information may also be supplied in various physical forms, depending on the number of wires employed by the detector. This may take the form of a detector with two wires in which the output is in series with the charge present on one of the power supply wires of the detector, a detector with three wires which then comprises a wire dedicated to its output, or a detector with four wires having two wires dedicated to two identical or complementary outputs.

Depending on the type of output from the detector employed, it will be necessary to adapt the configuration of the monitoring-control unit of equipment connected to it in order for the latter to always be compatible with all of the outputs provided.

The aim of the invention is to provide a universal interface that can be connected to a detector of any type, whether it has two wires, three wires or four wires and one or two outputs of the NO, NC, PNP or NPN type and allowing the communication of change of status to be provided between this detector and a monitoring-control unit of equipment without having to adapt this equipment.

PRESENTATION OF THE INVENTION

This aim is achieved by a universal interface arranged to be positioned between a detector and a monitoring-control unit of equipment and comprising:
- a connector with at least four input connection points configured for being connected to the detector and comprising a first connection point designed to receive a first electrical potential and for being connected to a first input of the detector, a second connection point designed to be connected to a first output of the detector for receiving a first detector output signal, a third connection point designed to receive a second electrical potential and for being connected to a second input of the detector, a fourth connection point designed to be connected to a second output of the detector for receiving a second detector output signal,
- a processing unit arranged for converting each detector output signal into binary information to be sent to the monitoring-control unit of equipment and which is representative of a switched status or of a non-switched status of each output of the detector.

According to one feature, the processing unit comprises:
- a first high threshold comparison unit connected to the second connection point and arranged for comparing the first detector output signal applied to the first output of the detector with a high threshold value for the purpose of generating at the output a first comparison signal, and a first low threshold comparison unit connected to the second connection point and arranged for comparing the first detector output signal applied to the first output of the detector with a low threshold value for generating at the output a second comparison signal,
- a first logic unit connected to the output of the first high threshold comparison unit and of the first low threshold comparison unit and comprising a processing logic function arranged for generating a first interface output signal as a function of the first comparison signal and of the second comparison signal,
- a second high threshold comparison unit connected to the fourth connection point and arranged for comparing the second detector output signal applied to the second output of the detector with a high threshold value for the purpose of generating at the output a first comparison signal, and a second low threshold comparison unit connected to the fourth connection point and arranged for comparing the second detector output signal applied to the second output of the detector with a low threshold value for generating at the output a second comparison signal,
- a second logic unit connected to the output of the second high threshold comparison unit and of the second low threshold comparison unit and comprising a processing logic function arranged for generating a second interface output signal as a function of the first comparison signal and of the second comparison signal.

According to another feature, the connector comprises a fifth connection point.

The invention also relates to a detection system comprising a detector and a universal interface such as defined hereinabove connected to said detector.

According to one feature, the detector has two wires, three wires or four wires.

According to another feature, the system comprises a monitoring-control unit of equipment receiving at the input the first interface output signal and the second interface output signal.

According to another feature, the system comprises an oscillator receiving at the input the first interface output signal and the second interface output signal and said oscillator comprises means for generating an output signal whose frequency varies according to the status of the first interface output signal and the status of the second interface output signal.

According to another feature, the system comprises a monitoring-control unit of equipment receiving at the input the output signal of the oscillator.

BRIEF DESCRIPTION OF THE FIGURES

Other features and advantages will become apparent in the detailed description that follows presented with regard to the appended drawings in which.

DETAILED DESCRIPTION OF AT LEAST ONE EMBODIMENT

The invention relates to a universal interface INT which can be connected to all the types of industrial detectors D so as to collect the information on its output or its outputs and to communicate it to a monitoring-control unit of equipment. In the appended figures, the monitoring-control unit of equipment shown is a programmable logic controller (or PLC), but it is of course not limited to this choice.

In the following part of the description, "detector" is understood to mean detectors with two wires, three wires or four wires together with the limit switches.

FIGS. 1A to 1J show various types of known outputs from detectors.

Figure 1A:
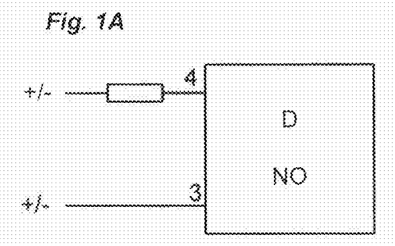
FIGS. 1A to 1J show the various types of known outputs from detectors.
Figure 1B:
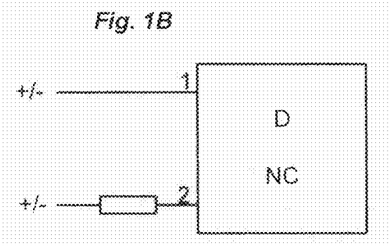
Figure 1C:
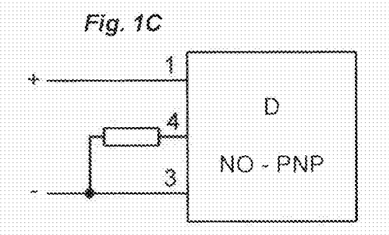
Figure 1D:
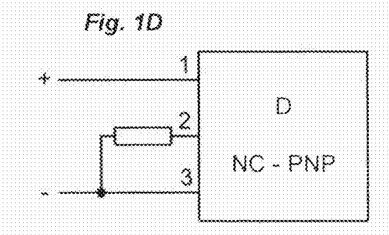
Figure 1E:
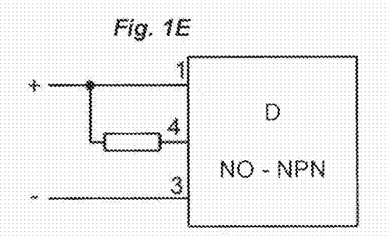
Figure 1F:
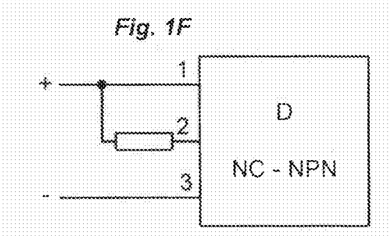
Figures 1G, 1H:
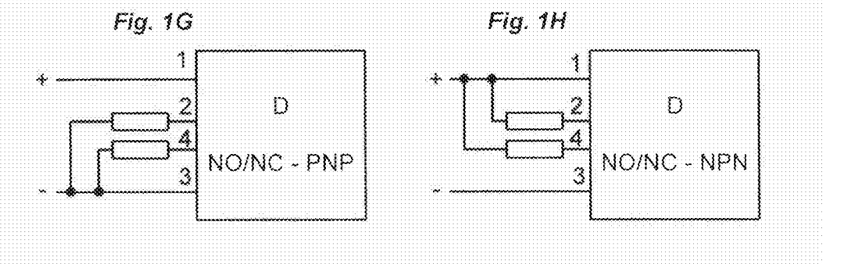
Figures 1I, 1J:
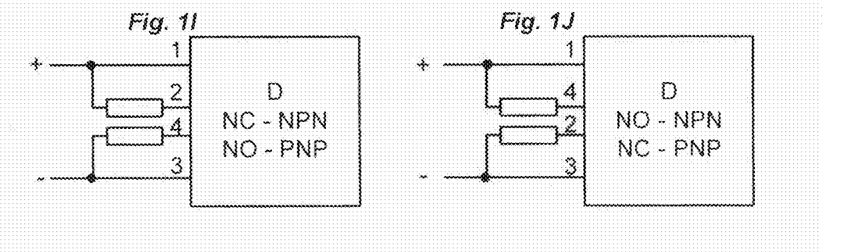

The detectors each comprise several connecting terminals numbered in a standard fashion. This numbering from 1 to 5 of the connecting terminals is also used in a corresponding manner in the universal interface INT of the invention. In the following part of the description, a universal interface INT is described with five connection points allowing it to be adapted to all types of detectors D having a connector with four connection points or with five connection points. However, as certain detectors have a connector with only four connection points, the interface INT of the invention could only comprise four connection points, without totally losing its universality. The object of the invention is indeed therefore a universal interface INT having a connector with at least four connection points. In FIGS. 1A and 1B, the detector D shown has two wires. The two wires are connected to the terminals 3 and 4 in the NO version or to the terminals 1 and 2 in the NC version. An electrical potential is applied to each wire for the purposes of powering the detector D. When its output is activated, the potential difference falls significantly.

In FIGS. 1C to 1F, the detectors D shown have three wires. Depending on the configuration, the three wires are connected to the terminals 1, 4 and 3 of the detector in the NO version or to the terminals 1, 2 and 3 of the detector D in the NC version. An additional wire is thus employed for receiving the output signal of the detector. The detector D with three wires can have a PNP or NPN output. The output signal applied is then at a high electrical potential or at a low electrical potential.

In FIGS. 1G to 1J, the detectors D shown have four wires. The four wires are connected to the terminals 1, 2, 3 and 4. These detectors comprise two outputs, thus allowing one of the two outputs to be chosen or both outputs to be exploited. The two outputs may be identical of the NO or NC type or complementary NO and NC.

Figure 4:
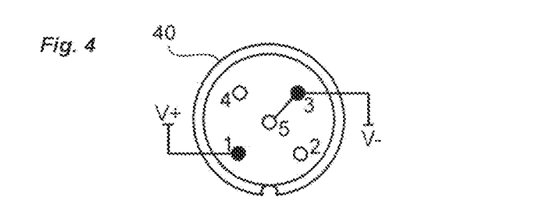
FIG. 4 shows the connector of the universal interface and the position of its various connection points.

In order to be adaptable to all these types of detectors D, the universal interface INT of the invention thus uses a connector 40 with five connection points such as shown in FIG. 4. The connection points are called first connection point (corresponding to the terminal 1), second connection point (corresponding to the terminal 2), third connection point (corresponding to the terminal 3), fourth connection point (corresponding to the terminal 4) and fifth connection point (corresponding to the terminal 5).

The aim of the universal interface INT of the invention is to convert the output signal or the output signals S1_D, S2_D from the detector D into binary information representative of the switched or non-switched status of each output of the detector, this binary information being exploitable by the monitoring-control unit of equipment connected. The universal interface INT thus comprises two inputs connected to the second connection point and fourth connection point, that can each receive a detector output signal S1_D or S2_D. In the appended figures, for each output signal S1_D, S2_D from the detector D applied to a separate input of the interface INT, the binary information generated by the universal interface INT corresponds to an output signal respectively denoted S1_I, S2_I.

The universal interface INT connected to the detector D thus comprises a processing unit UC arranged to perform this conversion.

The processing unit UC of the interface INT implements, for each output of the detector D, comparison functions allowing the switch to a high potential or the switch to a low potential to be detected for each output of the detector D, and a logic function allowing the logic of operation of the detector D to which the interface INT is connected to be taken into account.

The comparison functions are implemented for comparing the electrical potential applied to each of the two outputs of a detector D with two threshold values $V_{threshold-}$ and $V_{threshold+}$ of voltage, hereinafter denoted high threshold value $V_{threshold+}$ and low threshold value $V_{threshold-}$.

More precisely, in order to process the first detector output signal S1_D coming from the first output of the detector, the processing unit UC comprises:

a high threshold comparison unit 10 connected to the second connection point (2), corresponding to the first input of the interface INT, and implementing a function for comparison of the first detector output signal S1_D applied to the first output of the detector D with the high threshold value $V_{threshold+}$ for the purpose of generating at the output a first comparison signal, a low threshold comparison unit 20 connected to the second connection point (2) and implementing a function for comparison of the first detector output signal S1_D with the low threshold value $V_{threshold-}$ for the purpose of generating at the output a second comparison signal, a logic unit 30 connected to the output of the high threshold comparison unit 10 and of the low threshold comparison unit 20 and comprising a logic function arranged for generating an interface output signal S1_I destined for the monitoring-control unit of equipment (PLC) as a function of the first comparison signal and of the second comparison signal.

In order to process the second detector output signal S2_D coming from the second output of the detector D, the processing unit UC comprises the same architecture as that described hereinabove, in other words:

a high threshold comparison unit 11 connected to the fourth connection point (4), corresponding to the second input of the interface INT, and implementing a function for comparison of the second detector output signal S2_D applied to the second output of the detector D with the high threshold value $V_{threshold+}$ for the purpose of generating at the output a first comparison signal, a low threshold comparison unit 21 connected to the fourth connection point (4) and implementing a function for comparison of the second detector output signal S2_D with the low threshold value $V_{threshold-}$ for the purpose of generating at the output a second comparison signal, a logic unit 31 connected to the output of the high threshold comparison unit 11 and of the low threshold comparison unit 21 and comprising a logic function arranged for generating an interface output signal S2_I destined for the monitoring-control unit of equipment (PLC) as a function of the first comparison signal and of the second comparison signal.

For each output of the detector D, the solution therefore consists in comparing each detector output signal with the two threshold values described hereinabove. The two threshold values are chosen so as to be in the range between the two power supply electrical potentials of the detector, in other words:

$$V- < V_{threshold-} < V_{threshold+} < V+$$

When the output of the detector D is non-switched, the detector output signal S1_D (or S2_D) is at an electrical potential Vd. In this status, it is positioned between the two threshold values $V_{threshold-}$ and $V_{threshold+}$ and the outputs of the two comparison units are in the same status which will either be a high status or a low status.

When the output of the detector is switched, the electrical potential of the detector output signal S1_D (or S2_D) goes either above the high threshold value $V_{threshold+}$ for an output of the PNP type, or below the low threshold value $V_{threshold-}$ for an NPN output. If the high threshold value $V_{threshold+}$ is crossed, the comparison signal at the output of the comparison unit 10 (or 11) high threshold changes status, and if the low threshold value $V_{threshold-}$ is crossed, the comparison signal at the output of the comparison unit 20 (or 21) low threshold changes status.

The two comparison signals obtained are subsequently injected into the logic unit 30 (or 31). Each logic unit implements a logic function.

If the comparison functions chosen are such that their output is in the high status when the detector D is in a non-switched status, then the logic function must be of the "AND" type if it is desired to process the "switched status" information of the detector in negative logic, or of the type "NAND" for a processing of the "switched status" information in positive logic.

On the other hand, if the comparison functions chosen are such that their output is in the low status when the detector D is in a non-switched status, then the logic function must be of the "OR" type if it is desired to process the "switched status" information of the detector in positive logic or of the "NOR" type for a processing of the "switched status" information in negative logic.

Of course, if the detector D only comprises a single output, the processing unit of the universal interface INT only implements the two comparison units 10, 20 (or 11, 21) and the logic unit 30 (or 31) associated with this output. This is the case for the detectors with two wires or three wires which only have a single output.

The high threshold value $V_{threshold+}$ and the low threshold value $V_{threshold-}$ may be defined with respect to the positive power supply electrical potential V+, allowing a coherence between the voltages to be ensured, irrespective of the variations in the power supply electrical potential V+.

Figure 3A:
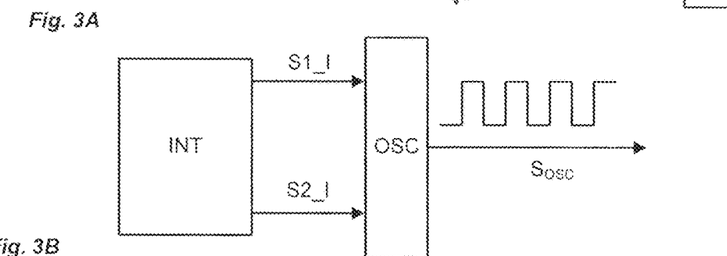
FIGS. 3A and 3B show the association of the interface with an oscillator together with the frequency signals generated according to the status of the output signals of the interface.
Figure 3B:
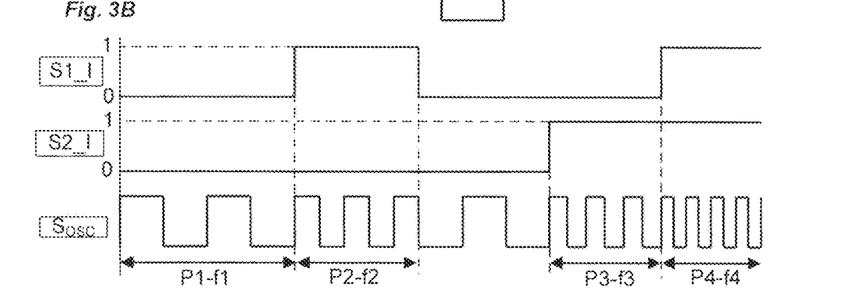

According to one variant embodiment, the binary information coming from the processing of each output signal S1_D, S2_D from the detector D by the universal interface INT may be transformed into frequency information, which allows the need for any learning procedure to be obviated. For this purpose, the two outputs of the universal interface INT just need to be connected to an oscillator OSC (FIG. 3A) that comprises means for generating a signal $S_{OSC}$ whose frequency will be modified according to the status of each of the output signals S1_I, S2_I of the interface INT. For example, with reference to FIG. 3B:

If S1_I=0 and S2_I=0, the oscillator generates, over a period P1, a signal $S_{OSC}$ at a first frequency f1.

If S1_I=1 and S2_I=0, the oscillator generates, over a period P2, a signal $S_{OSC}$ at a second frequency f2, different from the first frequency.

If S1_I=0 and S2_I=1, the oscillator generates, over a period P3, a signal $S_{OSC}$ at a third frequency f3, different from the first frequency f1 and from the second frequency f2.

If S1_I=1 and S2_I=1, the oscillator generates, over a fourth period P4, a signal $S_{OSC}$ at a fourth frequency f4, different from the first frequency f1, second frequency f2 and third frequency f3.

In FIGS. 2A to 2G, the universal interface INT of the invention is associated with the various known types of detectors. Depending on the configuration of the detector D, the universal interface INT will process the output or the outputs from the detector in order to convert it or them into binary information to be processed by the monitoring-control unit of equipment (PLC) situated downstream.

Figure 2A:
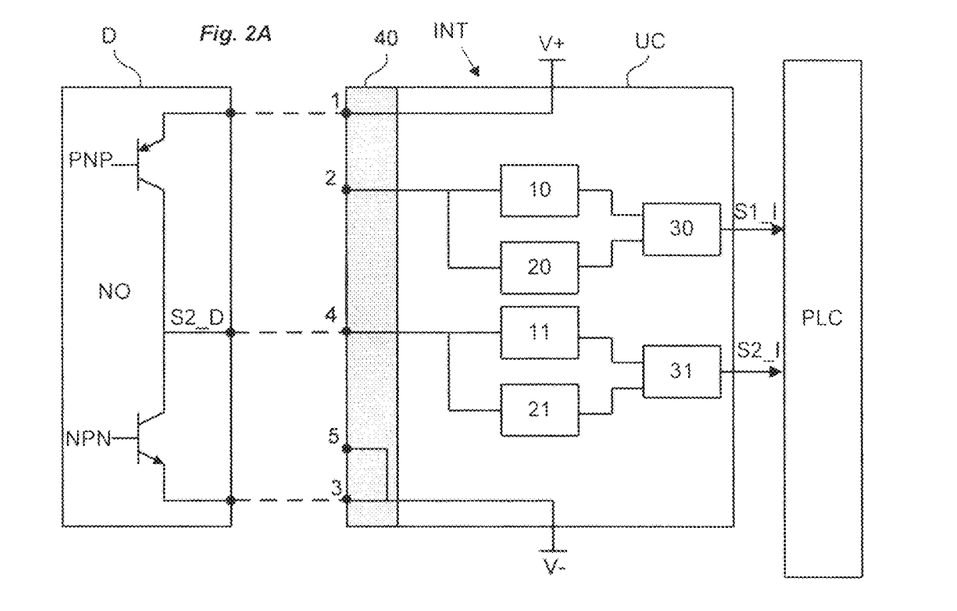
FIGS. 2A to 2G show the universal interface of the invention connected to various configurations of outputs of detectors.

In FIG. 2A, the universal interface INT is connected to a detector D with three wires with an NO output, NPN or PNP.

Figure 2B:
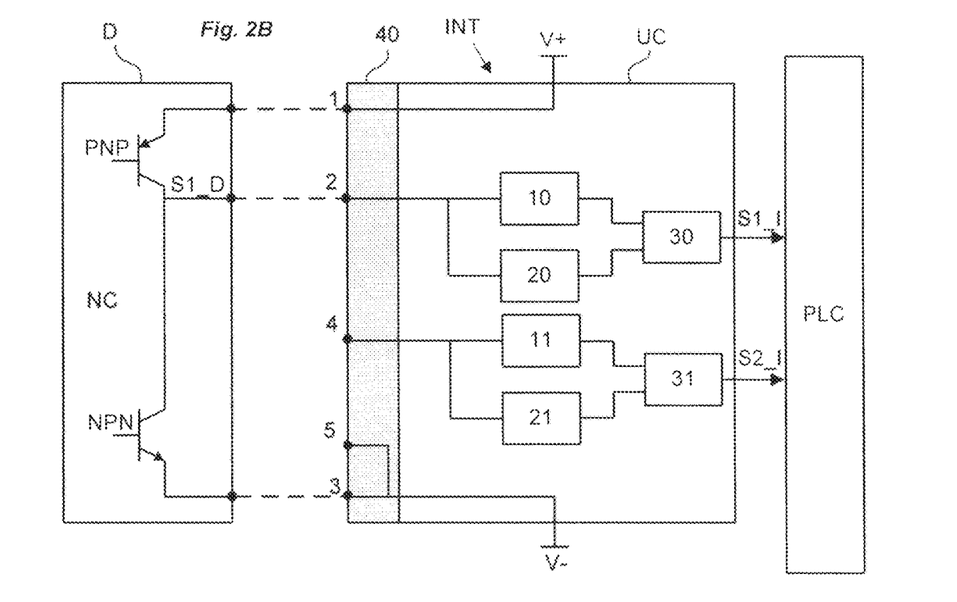

In FIG. 2B, the universal interface INT is connected to a detector D with three wires with an NC output, NPN or PNP.

Figure 2C:
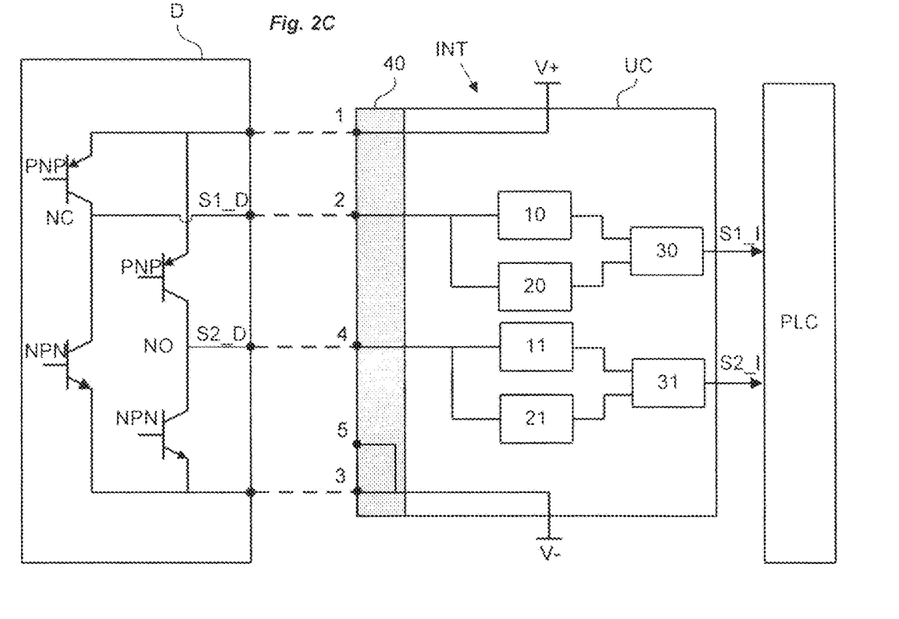

In FIG. 2C, the universal interface INT is connected to a detector with four wires with an NO output and an NC output of the NPN or PNP type.

Figure 2D:
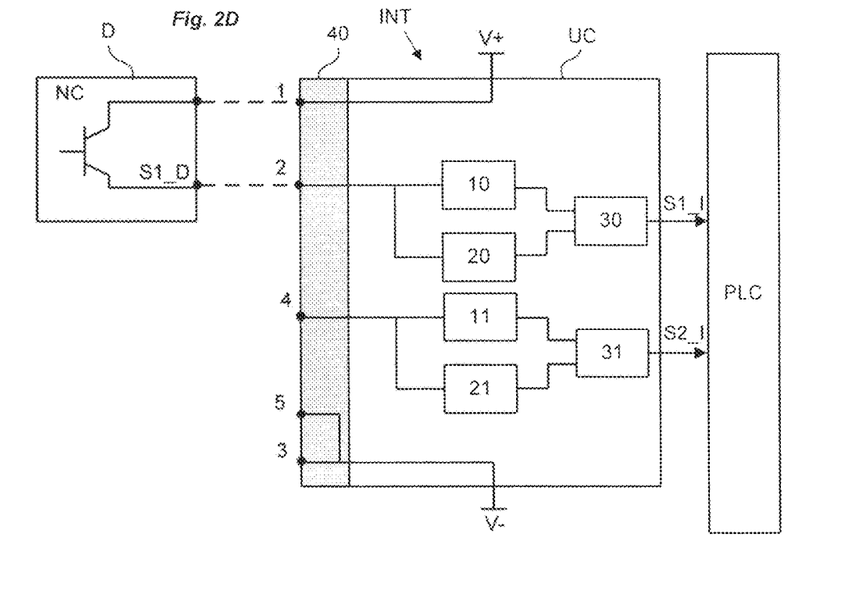

In FIG. 2D, the universal interface INT is connected to a detector with two wires with an NC output.

Figure 2E:
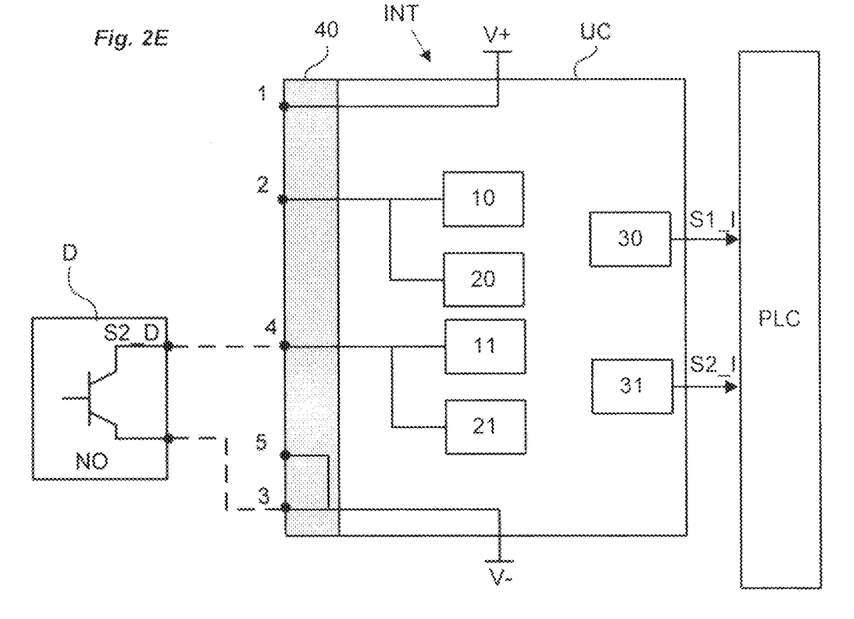

In FIG. 2E, the universal interface INT is connected to a detector with two wires with an NO output.

Figure 2F:
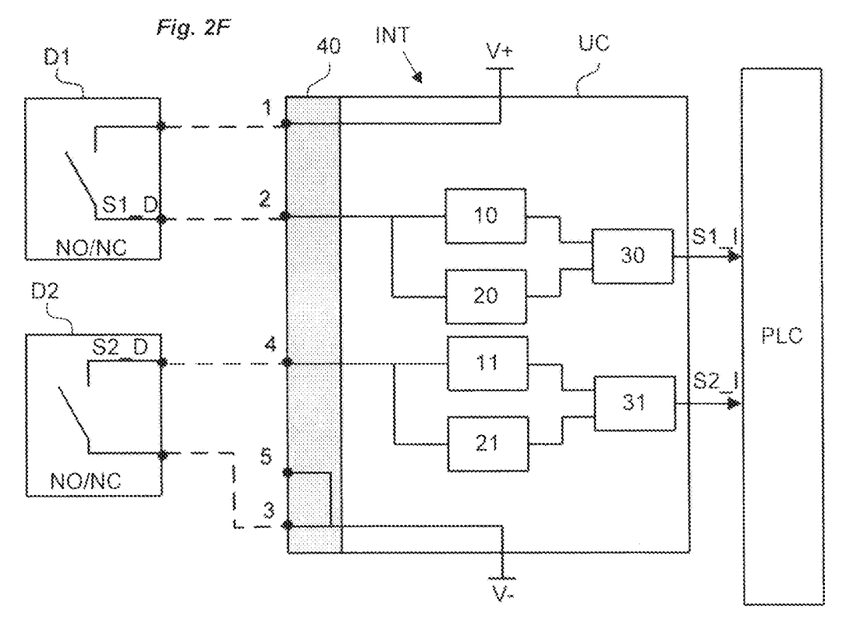
Figure 2G:
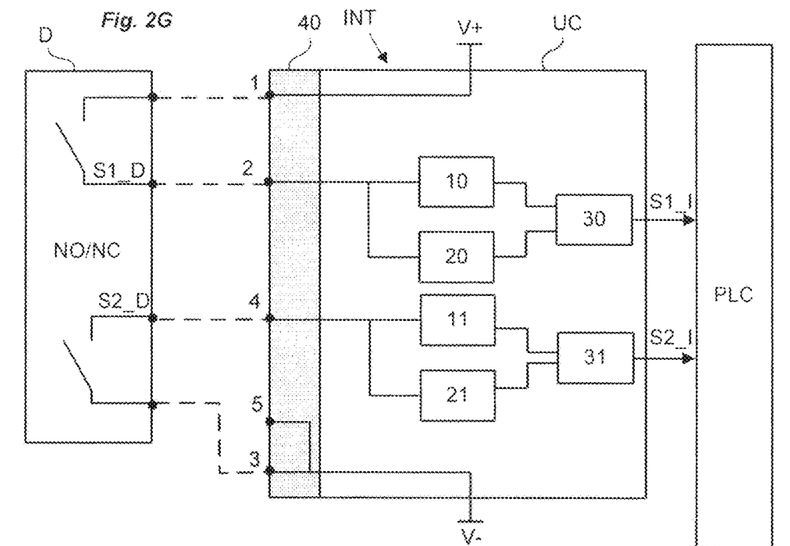

In FIG. 2F, the universal interface INT is connected to two detectors, of the limit switch type. Each limit switch is connected to a separate input of the interface INT.

The invention claimed is:

1. A universal interface arranged to be positioned between a detector and equipment control circuitry, comprising:
   a connector with at least four input connection points configured to connect to the detector and comprising a first connection point designed to receive a first electrical potential and connect to a first input of the detector, a second connection point designed to be connected to a first output of the detector and to receive a first detector output signal, a third connection point designed to receive a second electrical potential and to connect to a second input of the detector, and a fourth connection point designed to be connected to a second output of the detector and to receive a second detector output signal,
   processing circuitry configured to convert each of the first and second detector output signal into binary information to be sent to the equipment control circuitry and which is representative of a switched status or of a non-switched status of each output of the detector,
wherein the processing circuitry is configured to implement, for each output of the detector,
a comparison function permitting, for each output of the detector, detection of a switch to a high potential or detection of a switch to a low potential, and
a logic function permitting an operation logic of the detector, to which the universal interface is connected, to be taken in account.

2. The universal interface as claimed in claim 1, wherein the processing circuitry includes:
a first high threshold comparison circuit unit connected to the second connection point and configured to compare the first detector output signal applied to the first output of the detector with a high threshold value for a purpose of generating, at the output, a first comparison signal,
a first low threshold comparison circuit connected to the second connection point and configured to compare the first detector output signal applied to the first output of the detector with a low threshold value for generating, at the output, a second comparison signal,
a first logic circuit connected to output of the first high threshold comparison circuit and output of the first low threshold comparison circuit and comprising a first processing logic function program that when executed by the first logic circuit causes the first logical circuit to generate a first interface output signal as a function of the first comparison signal and of the second comparison signal,
a second high threshold comparison circuit connected to the fourth connection point and configured to compare the second detector output signal applied to the second output of the detector with a high threshold value for a purpose of generating, at the output, a third comparison signal,
a second low threshold comparison circuit connected to the fourth connection point and configured to compare the second detector output signal applied to the second output of the detector with a low threshold value for a purpose of generating, at the output, a fourth comparison signal, and
a second logic circuit connected to output of the second high threshold comparison circuit and output of the second low threshold comparison circuit and comprising a second processing logic function program that when executed by the second logic circuit causes the second logical circuit to generate a second interface output signal as a function of the third comparison signal and of the fourth comparison signal.

3. The universal interface as claimed in claim 1, wherein the connector comprises a fifth connection point.

4. A detection system comprising the detector and comprising the universal interface according to claim 2 connected to said detector.

5. The system as claimed in claim 4, wherein the detector has two wires, three wires or four wires.

6. The system as claimed in claim 4, wherein the control circuitry is configured to receive, via a third input, the first interface output signal and the second interface output signal.

7. The system as claimed in claim 4, further comprising an oscillator receiving, at the input, the first interface output signal and the second interface output signal, wherein said oscillator generates an output signal whose frequency varies according to the status of the first interface output signal and the status of the second interface output signal.

8. The system as claimed in claim 7, wherein the control circuitry is configured to receive, via a third input, the output signal from the oscillator.

* * * * *